United States Patent
Torvalds et al.

(10) Patent No.: US 7,331,041 B1
(45) Date of Patent: *Feb. 12, 2008

(54) METHOD OF CHANGING MODES OF CODE GENERATION

(75) Inventors: Linus Torvalds, Santa Clara, CA (US); H. Peter Anvin, San Jose, CA (US)

(73) Assignee: Transmeta Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/077,623

(22) Filed: Mar. 10, 2005

Related U.S. Application Data

(63) Continuation of application No. 09/417,979, filed on Oct. 13, 1999, now Pat. No. 6,880,152.

(51) Int. Cl.
*G06F 9/45* (2006.01)
(52) U.S. Cl. .................. 717/138; 717/139; 717/140
(58) Field of Classification Search ......... 717/136–140
See application file for complete search history.

(56) References Cited

U.S. PATENT DOCUMENTS

| | | | |
|---|---|---|---|
| 5,553,255 A | 9/1996 | Jain et al. | |
| 5,564,111 A | 10/1996 | Glew et al. | |
| 5,724,590 A | 3/1998 | Goettelmann et al. | |
| 5,774,711 A | 6/1998 | Henry et al. | |
| 5,838,978 A | 11/1998 | Buzbee | |
| 5,842,017 A | 11/1998 | Hookway et al. | |
| 5,958,061 A | 9/1999 | Kelly et al. | |
| 6,031,992 A | 2/2000 | Cmelik et al. | |
| 6,237,065 B1 | 5/2001 | Banerjia et al. | |
| 6,470,492 B2 | 10/2002 | Bala et al. | |
| 6,529,862 B1 | 3/2003 | Mann et al. | |
| 2002/0112227 A1 | 8/2002 | Kramskoy et al. | |
| 2002/0147969 A1* | 10/2002 | Lethin et al. | 717/138 |

FOREIGN PATENT DOCUMENTS

| | | |
|---|---|---|
| JP | 11-272476 | 8/1999 |
| WO | WO96/30829 | 10/1996 |
| WO | WO 98/28689 | 7/1998 |
| WO | WO 99/08188 | 2/1999 |

OTHER PUBLICATIONS

Chang el al.; "Distributing Computational Processes an Attached Risc Processor by Code Translation"; pp. 49-52; IEEE Tencon; Dept. of Computer Science; 1993; Hong Kong.

(Continued)

*Primary Examiner*—Richard L. Ellis

(57) ABSTRACT

A method for determining a process to use for converting instructions in a target instruction set to instructions in a host instructions set including the steps of executing code morphing software including an interpreter and a translator to generate host instructions from target instructions, detecting at intervals whether the interpreter or the translator is executing, increasing a count if the interpreter is executing and decreasing the count if the translator is executing, and changing from interpreting to translating a sequence of target instructions when the count reaches a selected maximum.

10 Claims, 2 Drawing Sheets

OTHER PUBLICATIONS

Chen el al.; "Microarchitecture Support for Improving the Performance of Lo Ad Target Prediction"; pp. 228-234; IEEE; Dept. of Electronic Engineering; 1997; Taiwan.

Glossner el al.; "Delft-Java Dynamic Translation"; pp. 57-62; IEEE; IBM Research, Delft University of Tech.; 1999; New York, The Netherlands.

Michael Gshwind, et al.; "Dynamic and Transparent Binary Translation"; Mar. 2000, IEEE.

Tom R. Kalfhill; "Emulation: Risc's Secret Weapon"; Apr. 1994, Byte.

Carol Thompson; "Java On IA-64"; pp. 41-47; Oct. 1998.

Cindy Zheng, et al.; "PA-Risc To IA-64:Transparent Execution, No Recompilation"; Mar. 2000 IEEE.

\* cited by examiner

METHOD OF CHANGING MODES OF CODE GENERATION

REFERENCE TO PRIOR U.S. APPLICATION

This application is a continuation of and claims priority to the patent application Ser. No. 09/417,979, entitled "Method for Determining a Mode of Code Generation," with filing date Oct. 13, 1999 now U.S. Pat. No. 6,880,152, and assigned to the assignee of the present invention, the disclosure of which is hereby incorporated herein by reference.

BACKGROUND OF THE INVENTION

1. Field of the Invention

This invention relates to computer systems and, more particularly, to methods for increasing the efficiency of operation of a microprocessor which dynamically translates instructions from a target to a host instruction set.

2. History of the Prior Art

Recently, a new microprocessor was developed which combines a simple but very fast host processor (called a "morph host") and software (referred to as "code morphing software") to execute application programs designed for a "target" processor having an instruction set different than the instruction set of the morph host processor. The morph host processor executes the code morphing software to translate the application programs into morph host processor instructions which accomplish the purpose of the original target software. As the target instructions are translated, the new host instructions are both executed and stored in a translation buffer where they may be accessed without further translation. Although the initial translation of a program is slow, once translated, many of the steps normally required for hardware to execute a program are eliminated. The new microprocessor has demonstrated that a simple fast processor designed to expend little power is able to execute translated "target" instructions at a rate equivalent to that of the "target" processor for which the programs were designed.

In order to be able to run programs designed for other processors at a rapid rate, the morph host processor includes a number of hardware enhancements. One of these enhancements is a gated store buffer which resides between the host processor and the translation buffer. A second enhancement is a set of host registers (in addition to normal working registers) which store known state of the target processor existing prior to any sequence of target instructions being translated. Memory stores generated as sequences of morph host instructions are executed are placed in the gated store buffer. If the morph host instructions execute without raising an exception, the target state at the beginning of the sequence of instructions is updated to the target state at the point at which the sequence completed and the memory stores are committed to memory.

It will be noted that the method by which the new microprocessor handles the execution of translations by placing the effects generated by execution in temporary storage until execution of the translation has been completed is effectively a very rapid method of speculating. The new microprocessor, in fact, uses the same circuitry for speculating on the outcome of other operations. For example, by temporarily holding the results of execution of instructions reordered by a software scheduler from naively translated instructions, more aggressive reordering may be accomplished than has been attempted by the prior art. When such a reordered sequence of instructions executes to produce a correct result, the memory stores resulting from execution of the reordered sequence may be committed to memory and target state may be updated. If the reordered sequence generates an exception while executing, then the state of the processor may be rolled back to target state at the beginning of the sequence and a more conservative approach taken in translating the sequence.

One of the most advantageous features of the new microprocessor is its ability to link together long sequences of translated instructions. Once short sequences of target instructions have been translated and found to execute without exception, it is possible to link large numbers of these short sequences together to form long sequences of instructions. This allows a translated program to be executed at great speed because the microprocessor need not go through all of the steps (such as looking up each of the shorter translated sequences) normally taken by hardware processors to execute instructions. Even more speed may be attained than might be expected because, once long sequences are linked, it is often possible for an optimizer to eliminate many of the steps from the long sequences without changing the results produced. Hardware optimizers have never been able to optimize sequences of instructions long enough to allow the patterns which allow significant optimization to become apparent.

A problem which has occurred with the new processor relates to those instructions of the target application which are executed only an insignificant number of times. For example, instructions required to initiate operation of a particular application are often executed only when the application is first called; and instructions required to terminate operation of an application are often executed only when the program is actually terminated. However, the new processor typically treats all instructions in the same manner. It decodes a target instruction, fetches the primitive host instructions which carry out the function for which the target instruction is designed, proceeds through a very extensive process of optimizing, and then stores the translated and optimized instructions in the translation cache. As the operation of the new processor proceeds, the sequences of translated instructions are linked to one another and further optimized; and the longer sequences of linked instructions are stored in the translation buffer. Ultimately, large blocks of translated instructions are stored as super-blocks of host instructions. When an exception occurs during execution of a particular host instruction or linked set of instructions, the new processor goes through the process of rolling back to the last correct state of the target processor and then provides single-step translations of the target instructions from the point of the last correct state to the point at which the exception again occurs. These translations are also stored in the translation cache. The new processor is described in detail in U.S. Pat. No. 5,832,205, Kelly et al., issued Nov. 3, 1998, and assigned to the assignee of the present invention.

Although this process creates code which executes rapidly, the process has a number of effects which limit the overall speed attainable and may cause other undesirable effects. First, the process requires a substantial amount of storage capacity for translated instructions. Many times a number of different translations exist for the same set of target instructions because the sequences were entered from different branches. Once stored, the translated instructions occupy this storage until removed for some affirmative reason. Second, if a sequence of instructions is to be run but once, the time required for translating and optimizing may be significantly greater than the time needed to execute a step-by-step translation of the initial target instructions. This tends to lower the average speed of the new processor.

For these reasons, the original processor was modified to include as a part of the code morphing software, an interpreter which accomplishes step-by-step translation of each of the target instructions. Although there are many possible embodiments, an interpreter essentially fetches a target instruction, decodes the instruction, provides a host process to accomplish the purpose of the target instruction, and executes the host process. When it finishes interpreting and executing one target instruction, the interpreter precedes to the next target instruction. This process essentially single steps through the interpretation and execution of target instructions. As each target instruction is interpreted and executed, the state of the target processor is brought up to date. The host instructions produced by the interpreter are not typically stored in the translation cache so linking and the further optimizations available after linking are not carried out. The interpreter continues this process for the remainder of the sequence of target instructions.

It was determined that, in general, not until some number of executions of any sequence of instructions have occurred does the time required for all of the previous interpretations and executions become equal to the time required to translate and optimize the sequence. Consequently, for instructions which are little used during the execution of an application, it is often desirable to utilize the interpreter instead of the translator software. Thus, a sequence of instructions which runs only once is often better and more rapidly handled by simply interpreting and never translating the sequence.

In order to make use of this advantage, the improved processor was modified to utilize the interpreter whenever a sequence of target instructions is first encountered. The interpreter software is associated with a counter which keeps track of the number of times sequences of instructions are executed. The interpreter may be run each time the sequence is encountered until it has been executed some number of times without generating an exception. When a target instruction has been interpreted and executed some selected number of times during the particular sequence, the code morphing software switches from the interpreter to the translator and its attendant optimization and storage processes. When this occurs, a sufficient number of executions will have occurred that it is probable that execution of the instructions will reoccur; and a stored optimized translation will provide significantly faster execution of the applications as a whole.

When the code morphing software switches to the normal translation process, the translation is optimized and stored in the translation cache. Thereafter, that translation may be further optimized and linked to other translations so that the very high speeds of execution realized from such processes may be obtained.

An especially useful embodiment of the improved processor records data relating to the number of times a target instruction is executed by the interpreter only at points at which branches occur in the instructions.

The interpreter single steps through the various target instructions until a branch occurs. When a branch instruction occurs, statistics regarding that particular branch instruction (the instruction with the particular memory address) are recorded. Since all of the target instructions from the beginning of a sequence until the branch will simply be executed in sequential order, no record need be kept until the point of the branch; and a significant number of steps related to storage in the translation cache are eliminated.

Moreover, if the interpreter is utilized to collect statistics in addition to the number of times a particular target instruction has been executed, additional significant advantages may be obtained. For example, if a target instruction includes a branch, the address of the instruction to which it branches may be recorded along with the number of times the branch has been executed. Then, when a number of sequential target instructions are executed by the interpreter, a history of branching and branch addresses will have been established. These statistics may be utilized to determine whether a particular sequence of instructions is probably going to become a super-block of translated instructions. By utilizing these statistics, a particular sequence of instructions may be speculatively considered to be a super-block after being executed a significant number of times. After being interpreted for the selected number of times, the sequence may be translated, optimized, linked through the various branches without the necessity to go through a separate linking operation, and stored as such in the translation cache. If the speculation turns out to be true, then significant time is saved in processing the instructions. If not, the operation simply causes an exception which returns the code morphing software to the interpreter.

Not only is the interpreter useful for generating host code for sequences which are used infrequently, it is also utilized in handling exceptions. Whenever the modified processor encounters a target exception while executing any translated target application, the code morphing software causes a rollback to occur to the last known correct state of the target processor. Then, the interpreter portion of the code morphing software is utilized rather than the translator portion to provide host instructions. The interpreter single steps through the generation and execution of target instructions. As each target instruction is interpreted and executed, the state of the target processor is brought up to date.

The interpreter continues this process for the remainder of the sequence of target instructions until the exception again occurs. At this point, the state of the target processor is correct for the state of the interpretation so that the exception can be handled correctly and expeditiously. Because the interpretation process is so simple, the process of determining the point of occurrence of a target exception is significantly faster than the determination of such a point when carried out by the translation process which goes through the above-described translation and optimization process and then is stored in the translation cache.

By combining the interpreter with the optimizing translator which functions as a dynamic compiler of sequences of translated instructions, the code morphing software removes many of the limits to the upper speed of execution of target applications by the new processor. The use of the interpreter to handle early executions of instructions eliminates the need to optimize instructions which are little used during execution of the application and thereby increases the speed of operation. The need to store these little used instructions in the translation cache reduces the need for storage and eliminates the need for discarding many translated instructions. The use of the interpreter to handle exceptions produces the same useful effects as using the translator yet speeds operations and reduces storage requirements.

The improved processor is described in detail in U.S. patent application Ser. No. 09/417,332, entitled "Method For Integration Of Interpretation And Translation In A Microprocessor", by R. Bedichek et al., filed on Oct. 13, 1999, and assigned to the assignee of the present invention.

Even though the combination of an interpreter and a translator functions to greatly improve the operation of the unique microprocessor, some problems in operation remain. These problems may be generally described as an inability to utilize the two functions optimally. Because there are so many types of operations conducted by sequences of instructions in any application program, it is quite difficult to determine to the point at which interpretation should end and translation begin. Often a process which has been interpreted for a sufficient number of times to be translated is never again used so the code simply occupies space in the translation cache. Other processes are reused constantly. Moving the point at which translation commences does not appear to solve the problem.

It is desirable to improve the operational speed of the improved microprocessor so that it executes more rapidly by modifying the processes for controlling the use of the interpreter and translator software of the code morphing software.

SUMMARY OF THE INVENTION

It is, therefore, an object of the present invention to provide a faster microprocessor compatible with and capable of running application programs and operating systems designed for other microprocessors.

This and other objects of the present invention are realized by a method for determining a process to use for converting instructions in a target instruction set to instructions in a host instructions set comprising the steps of executing code morphing software including an interpreter and a translator to provide host instructions from target instructions, detecting at intervals whether the interpreter or the translator is executing, increasing a count if the interpreter is executing and decreasing the count if the translator is executing, and changing from interpreting to translating a sequence of target instructions when the count reaches a selected maximum.

These and other objects and features of the invention will be better understood by reference to the detailed description which follows taken together with the drawings in which like elements are referred to by like designations throughout the several views.

DETAILED DESCRIPTION

Rather than simply counting the number of times a sequence of target instructions is interpreted before it is translated and optimized, the present invention attempts to lend some intelligence to the process. It does this by utilizing processes which attempt to maintain a balance selected by system designers of the amount of interpretation versus the amount of translation.

Figure 1:
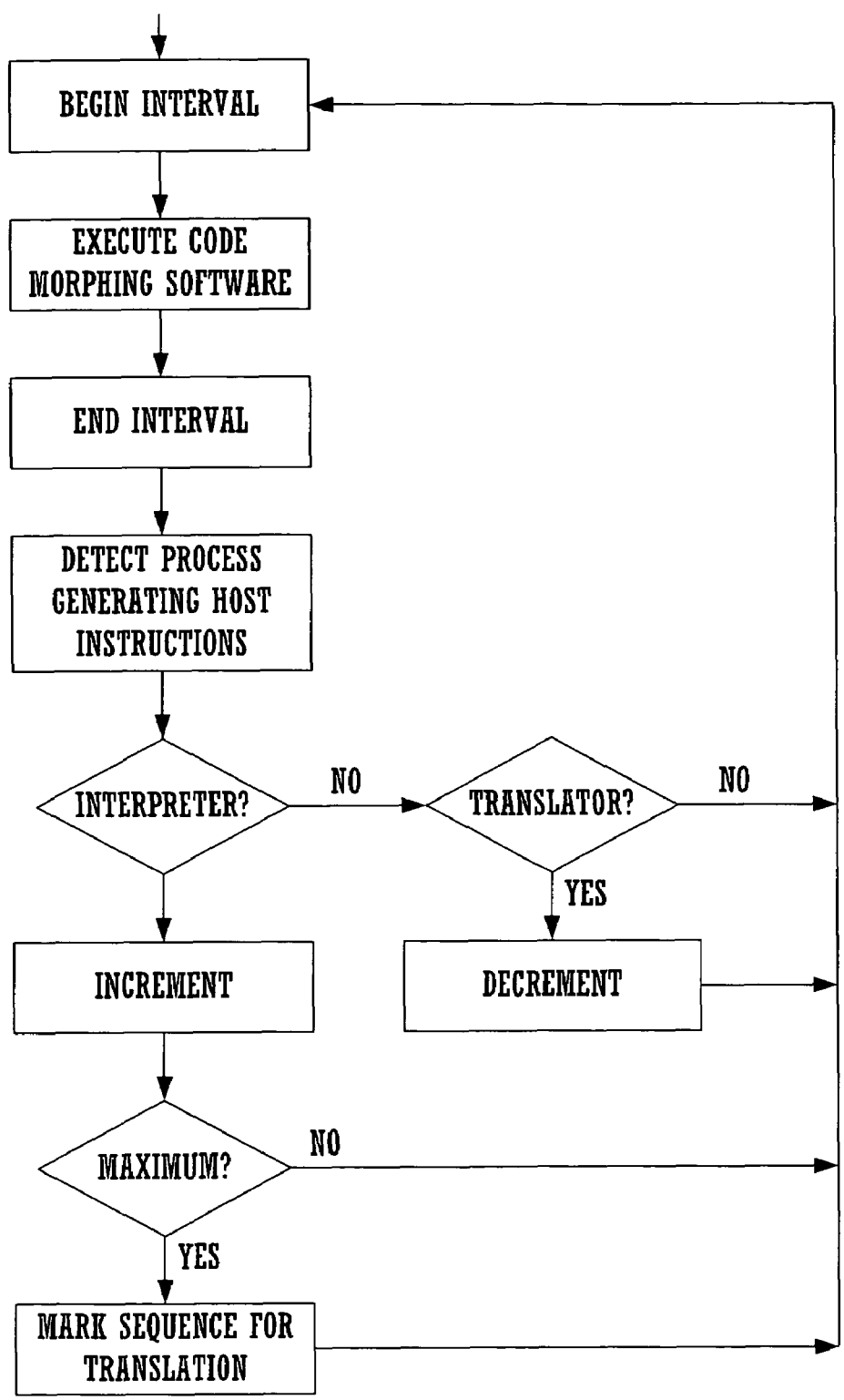
FIG. 1 is a flow chart illustrating a first embodiment of the invention.

In a basic embodiment of the invention illustrated in FIG. 1, the amount of time being spent in interpreting target instructions as contrasted to the amount of time spent in translating target instructions is determined. If the time spent interpreting is too great, then the processor simply switches to translating. As the code morphing software is converting sequences of target instructions into sequences of host instructions by interpreting or translating and is executing those converted sequences, the process of the invention essentially tests the amount of time being spent in each of interpretation and translation processes in order to determine if too much time is being spent interpreting. The utilization of this new process allows the operations being conducted by the processor to determine whether the method of instruction conversion being used is optimal for accelerating the overall operation of the processor.

One embodiment for carrying out the testing operation utilizes a timer to select intervals at which the particular operation being run by the code morphing software is tested. For example, every thousandth of a second the operation may be tested to determine whether the interpreter or the translator is running. The test itself is statistically more likely to occur during periods in which excess time is being taken and thus during conversion by the interpreter. The result of each interrogation is furnished to a counter which counts up for each determination that the interpreter is running and down for each determination that the translator is running. If the count reaches a maximum, then the operation of the software is switched from interpreting to translating at the next execution of that sequence of instructions no matter what sequence of instructions is being converted. This helps to increase the amount of translation being conducted compared to interpretation and speeds up execution. On the other hand, as long as the counter does not reach a maximum, the operation of generating host instructions from target instructions continues without change.

In general, this method of testing determines whether or not the software of the processor is doing too much interpreting as contrasted to translation. The maximum value at which the counter is set may be selected in accordance with the invention to reflect the amount of the interpreting operation determined to be desirable for the best utilization of the processor. For example, if more interpreting is desired, a higher maximum value is selected; while if more translating is desired, a lower maximum value is selected. It is also possible to weight the results of interrogation differently for interpretation and translation. For example, a test finding that interpretation is running might increase the count by one, while a test finding that translation is running might decrease the count by only one-half. Other values weighted to favor one or the other of the processes might also be used based on the results desired by system designers. This method of switching between interpretation and translation provides more accurate results than simply counting the number of times a particular operation is interpreted before switching to translation.

Another embodiment of the invention accomplishes the testing by utilizing an interval determined by the execution of a set number of instructions rather than an interval of time. This embodiment is more likely to provide accurate information regarding the percentage of time the interpreter is operating than the embodiment using a timed interval because it compares instructions to instructions rather than instructions to time. This embodiment requires using a single counter to measure the number of instructions executed by the host. After a set number of instructions have been executed, the code morphing software tests the operating process to determine whether the interpreter or the translator is running. The remainder of the process is carried out in the same manner as the embodiment using a timed interval to determine when to test to determine whether the process is interpretation or translation.

Figure 2:
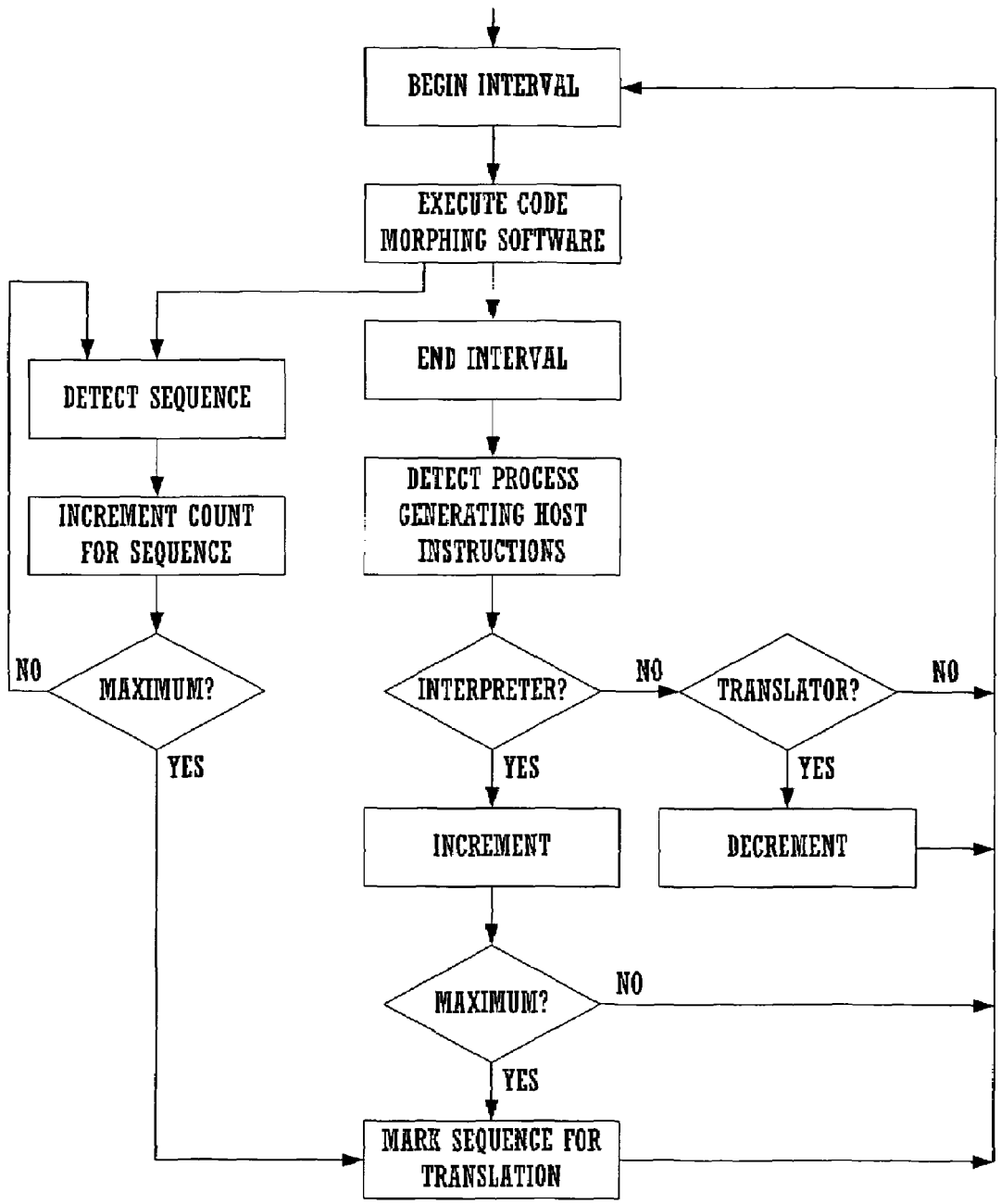
FIG. 2 is a flow chart illustrating a second embodiment of the invention.

One advanced embodiment of the invention shown in FIG. 2 utilizes a combination of the counting method disclosed in the patent application described above and the method of testing at intervals to determine which process is being executed. Both the counting and interval testing methods are run constantly while the conversion process proceeds. The counting method counts the number of times each particular sequence of instructions is interpreted and switches to translation of the sequence when a specified number of interpretations of the sequence have executed without error. The counting scheme is able to determine very rapidly when short processes such as tight loops have been running a numbers of times and should be translated. The interval testing method runs at the same time to determine whether the overall operation of conversion is spending too much time interpreting. The interval testing method of determining when to switch between conversion processes is able to detect more rapidly when longer sequences of instructions are being interpreted than the counting method and thus switches to translation faster for such sequences.

More advanced embodiments of the present invention may utilize another combination of the original counting method and the interval testing method. More particularly, one such embodiment may provide for counting the number of times instructions are interpreted until the same instruction has been interpreted some selected number of times. During this counting process, a count of the number of times the sequence has been interpreted is accomplished and statistics may be kept for each sequence. Once the maximum count has been reached, the code morphing software shifts to a translation process. During the same period, the code morphing software may continue testing at intervals the mode in which the host processor is converting all instructions to determine whether the conversion process should be switched from interpreting to translating. When either test is met, the code morphing software switches from interpreting to translating the particular sequence. However, the translation accomplished may be less than optimal and thus quickly completed. For example, the translation process might translate and reorder to favor a particular branch without any linking to other sequences. When executing the modestly translated process, the software may also use the counting test and gather branch statistics but over a longer period of time so that more knowledge of the actual operation of the translated sequence may be derived. These statistics are very useful in determining the form more optimized translations should take. Alternatively, or in addition, the code morphing software may continue testing at intervals the mode in which the host processor is converting all instructions to determine whether the translation should be switched from modest translation process to a more thorough translation process such as one involving significant amounts of linking of sequences and optimizing across linked sequences. If the testing process reaches a maximum at a test point at which a minimum translation is executing, the process switches to translation with more advanced optimization controlled by the much larger pool of accumulated branch statistics.

There are many possible modifications of the process of the present invention which can be implemented. Theoretically, there is no reason that any number of intermediate steps of translation cannot be implemented utilizing different levels during testing to determine whether to switch to a next level of translation.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A method of transferring between types of conversion processes in a computer which converts instructions from a target instruction set to a host instruction set, comprising:
   executing code morphing software including an interpreter and a translator to generate host instructions from target instructions;
   detecting at intervals whether said interpreter or said translator is operating to generate said host instructions, wherein at least one interval is determined by the execution of a set number of instructions;
   testing for a first amount of time spent by said interpreter while interpreting said target instructions;
   testing for a second amount of time spent by said translator while translating said target instructions; and
   changing from interpreting to translating when said first amount of time in comparison with said second amount of time reaches a selected maximum.

2. The method of claim 1, wherein said testing for a first amount of time further comprises:
   testing at specific intervals of time to determine whether said interpreter is operating; and
   increasing a count whenever said interpreter is tested to be operating.

3. The method of claim 2, wherein said testing for a second amount of time further comprises:
   testing at said specific intervals of time to determine whether said translator is operating; and
   decreasing said count whenever said translator is tested to be operating.

4. The method of claim 1, wherein said changing from interpreting to translating further comprises:
   weighting said translating by increasing said second amount of time.

5. The method of claim 1, wherein said changing from interpreting to translating further comprises:
   weighting said interpreting by increasing said first amount of time.

6. The method of claim 1, wherein said changing from interpreting to translating further comprises:
   increasing a count if said interpreter is operating and decreasing said count if said translator is operating; and
   changing from interpreting to said translating a sequence of target instructions in response to said count reaching said selected maximum.

7. The method of claim 1, further comprising:
   incrementing a count for each instance in which a sequence of instructions is interpreted; and
   changing from interpreting to translating a sequence of target instructions when said count reaches a selected maximum.

8. A method of transferring between types of conversion processes in a computer which converts instructions from a target instruction set to a host instruction set, comprising:
   executing code morphing software including an interpreter and a translator to generate host instructions from target instructions;
   incrementing a count for each instance in which a first sequence of instructions is interpreted;
   changing from interpreting to translating said first sequence of target instructions when said count reaches a selected maximum;
   simultaneously detecting at intervals whether the interpreter or translator is operating for all instruction sequences, wherein at least one interval is determined by the execution of a set number of instructions;

increasing a count if said interpreter is operating and decreasing said count if said translator is operating; and changing from said interpreting to translating subsequent sequences of target instructions in response to reaching said selected maximum.

9. The method of claim 8, wherein said interval comprises a selected number of executed target instructions.

10. The method of claim 9, wherein said interval comprises a selected time period.

* * * * *